United States Patent
Poulin

(10) Patent No.: US 10,992,596 B2
(45) Date of Patent: *Apr. 27, 2021

(54) SYSTEMS, METHODS, AND COMPUTER PROGRAM PRODUCTS FOR COMPUTER NODE RESOURCE MANAGEMENT

(71) Applicant: Ribbon Communications Operating Company, Inc., Westford, MA (US)

(72) Inventor: Eric Poulin, Pierrefonds (CA)

(73) Assignee: RIBBON COMMUNICATIONS OPERATING COMPANY, INC., Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/431,285

(22) Filed: Feb. 13, 2017

(65) Prior Publication Data

US 2017/0155597 A1 Jun. 1, 2017

Related U.S. Application Data

(63) Continuation of application No. 14/206,167, filed on Mar. 12, 2014, now Pat. No. 9,571,340.

(51) Int. Cl.
*H04L 12/927* (2013.01)
*H04L 12/24* (2006.01)
(Continued)

(52) U.S. Cl.
CPC ........ *H04L 47/801* (2013.01); *H04L 41/0813* (2013.01); *H04L 43/0817* (2013.01);
(Continued)

(58) Field of Classification Search
CPC .. H04L 41/0813; H04L 67/1036; H04L 69/16
(Continued)

(56) References Cited

U.S. PATENT DOCUMENTS 7,486,621 B2 2/2009 Bessis et al.
2004/0240389 A1* 12/2004 Bessis ..................... H04L 47/10
370/252

(Continued)

FOREIGN PATENT DOCUMENTS

EP 2146467 1/2010

OTHER PUBLICATIONS

ITU-T H.248.32 Gateway Control Protocol: Detailed Congestion Reporting Package (http://ww.itu.int/rec/T-REC-H.248.32), Mar. 2013, 11 pgs.

(Continued)

*Primary Examiner* — Joseph L Greene
(74) *Attorney, Agent, or Firm* — Haynes and Boone, LLP

(57) ABSTRACT

A method performed by a controlling computer node in a network with a plurality of subordinate computing nodes, the method including: receiving, from a first subordinate computer node, information indicating computing resource impacts for a plurality of different processing functions; receiving, from a communication endpoint, a processing task; determining an impact upon available resources of the first subordinate computer node if the task were to be assigned to the first subordinate computer node, wherein the determining is performed using the information indicating computing resource impacts; and assigning the task to either the first subordinate computer node or another one of the subordinate computer nodes based at least in part on the determining the impact.

20 Claims, 3 Drawing Sheets

(51) Int. Cl.
*H04L 29/06* (2006.01)
*H04L 29/08* (2006.01)
*H04L 12/26* (2006.01)

(52) U.S. Cl.
CPC ...... *H04L 65/1023* (2013.01); *H04L 65/1043* (2013.01); *H04L 65/1069* (2013.01); *H04L 65/80* (2013.01); *H04L 67/1008* (2013.01); *H04L 67/1036* (2013.01); *H04L 69/16* (2013.01)

(58) Field of Classification Search
USPC .......................................................... 709/226
See application file for complete search history.

(56) References Cited

U.S. PATENT DOCUMENTS

| | | | |
|---|---|---|---|
| 2007/0245004 A1* | 10/2007 | Chess et al. | G06F 15/173 709/223 |
| 2008/0008160 A1 | 1/2008 | Uhler et al. | |
| 2008/0096547 A1* | 4/2008 | Zhang | H04W 24/04 455/424 |
| 2008/0189162 A1* | 8/2008 | Ganong | G06F 17/3089 705/7.13 |
| 2011/0022882 A1* | 1/2011 | Jaehde | G06F 11/2023 714/4.1 |
| 2011/0125905 A1* | 5/2011 | Baucke | H04M 15/00 709/226 |
| 2012/0078388 A1* | 3/2012 | Collins | G06Q 10/06 700/19 |
| 2015/0341594 A1 | 11/2015 | Ma et al. | |

OTHER PUBLICATIONS

ITU-T H.248.10 Gateway control protocol: Media Gateway resource congestion handling package: http://www.itu.int/rec/T-REC-H.248.10, republished Mar. 29, 2002, 8 pages.

ITU-T H.248.63 Gateway control protocol: Resource management packages: http://www.itu.int/rec/T-REC-H.248.63, Oct. 19, 2009, 18 pages.

* cited by examiner

SYSTEMS, METHODS, AND COMPUTER PROGRAM PRODUCTS FOR COMPUTER NODE RESOURCE MANAGEMENT

PRIORITY INFORMATION

The present application is a continuation of U.S. patent application Ser. No. 14/206,167 filed Mar. 12, 2014, and entitled "Systems, Methods, and Computer Program Products for Computer Node Resource Management," the disclosure of which is hereby incorporated by reference in the entirety.

TECHNICAL FIELD

The present description relates, in general, to network computer systems and, more specifically, to techniques for managing computer node resources in network computer systems.

BACKGROUND

H.248 is a protocol recommendation from the ITU Telecommunication Standardization Sector (ITU-T), which enables separation of call control from media conversion. H.248 defines a Media Gateway Controller (MGC) and a Media Gateway (MG), where a given MGC may control more than one (but usually fewer than ten) MGs. During the signaling process, which establishes a call from one endpoint to another endpoint, the MGC assigns the call to one of several MGs. However, some MGs may be more congested than others or may have fewer remaining licensed instances of a desired codec for use in a call.

Most MGCs use a round robin approach to distribute calls and rely on a congestion detection mechanism such as the ones described in the ITU-T Recommendation H.248.10 (Gateway control protocol: Media gateway resource congestion handling package) or ITU-T Recommendation H.248.32 (Gateway control protocol: Detailed congestion reporting package) to redirect traffic when congestion occurs. The round robin approach attempts to ensure fairness by spreading out the received calls one after the other to each available MG. However, the round robin approach can result in unbalanced load because one given call may use more resources than another given call (e.g., by using different codecs). When a particular MG happens to be assigned multiple calls using high levels of resources, congestion may occur. The congestion detection mechanism relies on MGs to request call diversion or call drops from the MGC when congestion occurs. The congestion detection mechanism is reactive, though, and is applied after congestion is present.

Other implementations may use an approach similar to the one described in the ITU-T Recommendation H.248.63 (Gateway control protocol: resource management packages) or in EP 2146467A1. This approach relies entirely on the MGC to reserve and/or allocate media capability (referred to as "abstract resource" in the recommendation) on the MGs it controls, hence requiring the MGC to have a holistic view of the internal limitations inherent to its MGs. The MGs then abide by the restrictions imposed by the MGC. Recommendation H.248.63 does not take into account the impact that using one unit of a given media capability has on the overall performance of a MG. There is a need for a more robust and efficient way to manage MGs.

BRIEF DESCRIPTION OF THE DRAWINGS

The present disclosure is best understood from the following detailed description when read with the accompanying figures.

SUMMARY

Figure 1:
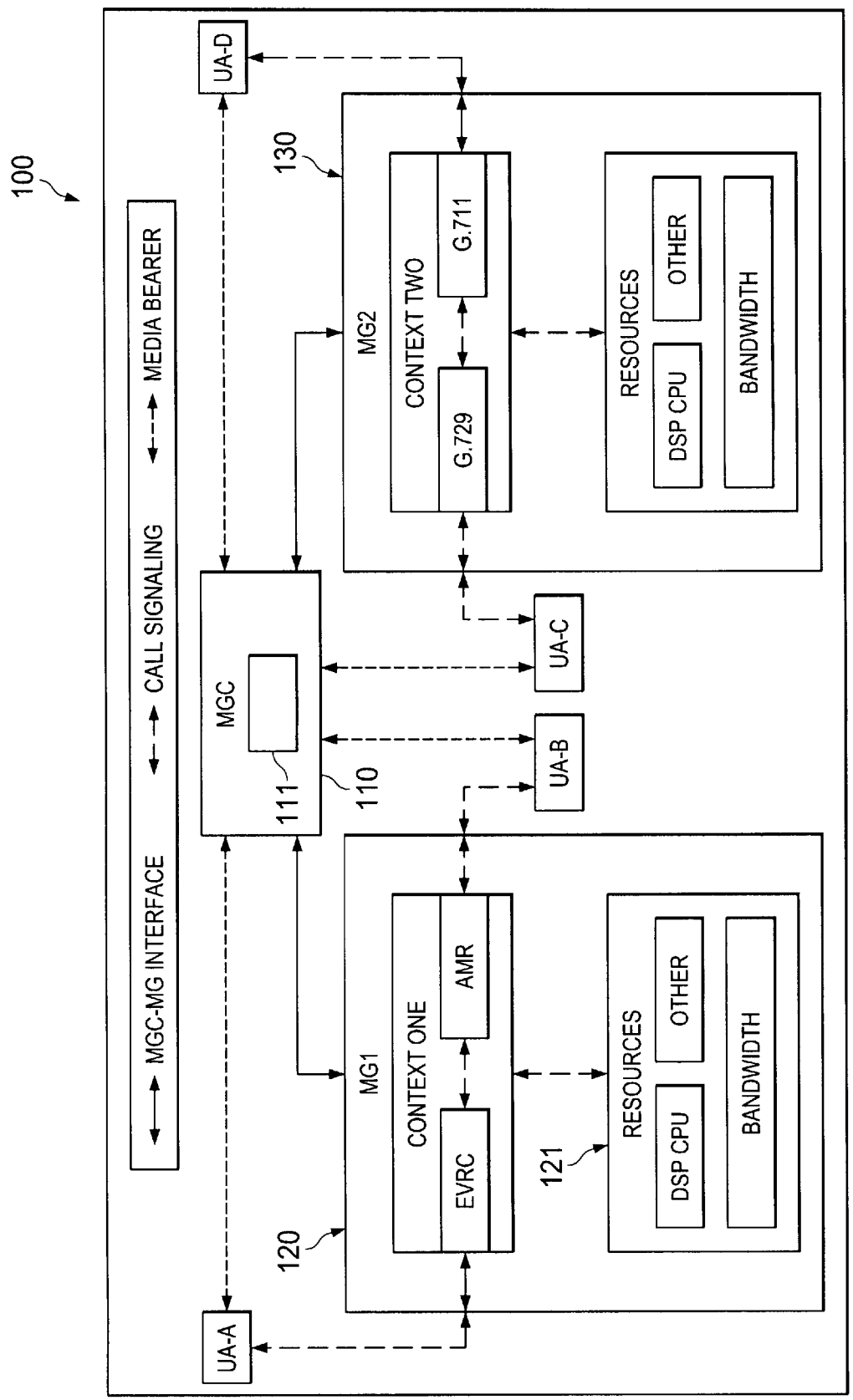
FIG. 1 is an illustration of an exemplary network architecture, adapted according to one embodiment.

According to one embodiment, a method is performed by a controlling computer node in a network with a plurality of subordinate computing nodes, the method including: receiving, from a first subordinate computer node, information indicating computing resource impacts for a plurality of different processing functions; receiving, from a communication endpoint, a processing task; determining an impact upon available resources of the first subordinate computer node if the task were to be assigned to the first subordinate computer node, wherein the determining is performed using the information indicating computing resource impacts; and assigning the task to either the first subordinate computer node or another one of the subordinate computer nodes based at least in part on the determining the impact According to another embodiment, a system includes: a controlling computer node in a network and communicating with a plurality of subordinate computing nodes, the controlling computer node including a processor executing computer-readable code to: receive, from a first subordinate computer node, information indicating available resources and resource impacts; receive, from a communication endpoint, a processing task; calculate a use of available resources for the first subordinate computer node to execute the task, wherein the calculating is based at least on part on the information indicating available resources and resource impacts; compare the use of available resources of the first subordinate computer node to that of other ones of the subordinate computer nodes; and assign the task to either the first subordinate computer node or another one of the subordinate computer nodes based at least in part on the comparing.

According to another embodiment, a computer program product has a computer readable medium tangibly recording computer program logic for establishing a multimedia communication session between a first user and a second user, the computer program product including: code to receive, at a controlling computer node, a request to establish the multimedia communication session; code to select a first subordinate computer node of a plurality of subordinate computer nodes to handle the multimedia communication session, the selecting including: code to examine respective resource usage impacts upon each of the subordinate computer nodes by viewing the multimedia communication session as a unit of use of a multimedia capability that is associated with a presumed resource usage impact at each of the subordinate computer nodes; code to compare the respective resource usage impacts among the plurality of subordinate computer nodes; and code to select the first subordinate computer node to handle the communication session in response to the comparing; and code to assign the multimedia communication session to the first subordinate computer node in response to the selecting.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Various embodiments provide techniques for a controlling computer node to assign tasks to subordinate computer nodes. In one example, the controlling computer node is an H.248 MGC, the subordinate computer nodes are MGs, and the tasks include voice and/or video calls according to Voice over Internet Protocol (VoIP). In fact, the examples below are directed to H.248 embodiments, though the scope of embodiments may include techniques involving any appropriate computer nodes, whether H.248 nodes or otherwise, and any appropriate processing tasks.

In one example, when an MG registers with an MGC, the MGC sends an audit command to the MG. The MG responds to the audit command by providing a maximum number of instances of a capability (e.g., a maximum number of licensed codec instances) and resource impacts for a unit of use of a given capability (e.g., CPU usage impacts for an instance of each available codec). The MG may also provide current usage statistics for the resources (e.g., current CPU usage). The MGC stores the above information for each of its managed MGs. As calls come in, the MGC assigns those calls to its managed MGs in a way that takes into account the limits of the capabilities and the resource impacts. For instance, the MGC may perform load balancing for CPU use, Digital Signal Processor (DSP) use, hardware accelerator use, bandwidth use, and/or the like. Similarly, the MGC may distribute calls so as to balance or concentrate codec license use among the MGs. Specific algorithms are discussed in more detail below.

FIG. 1 is an illustration of exemplary network architecture 100, adapted according to one embodiment. Architecture 100 includes MGC 110, which has an assignment module 111. Assignment module 111 runs an algorithm to determine which of the MGs 120, 130 should be assigned a given call. The MGs 120, 130 communicate with MGC 110 according to H.248 in this example (an MGC-MG interface). UA-A, UA-B, UA-C, and UA-D are endpoints, such as IP private branch exchanges (PBXs), session border controllers, another MGC/MG node, wireless network endpoints such as base station controllers, and the like, that communicate with each other via MGs 120 and 130. The UAs may communicate with each other using, e.g., Real Time Transport Protocol (RTP) or other protocol carrying voice or video. The UAs communicate with MGC 110 using a signaling protocol, such as Session Initiation Protocol (SIP).

In the example of FIG. 1, MGs 120, 130 have already registered with MGC 110 and provided their information regarding capabilities, resource impacts, and current resource usage statistics. Focusing on the left-hand half of FIG. 1, UA-A initiates a call with UA-B using SIP in this example. The SIP INVITE message includes a designation of a codec used by UA-A. MCG 110 then proceeds to set up the call, receiving codec information from UA-B. Assignment module 111 then determines whether to assign the call to MG 120 or MG 130 depending, among other things, on the codecs being used by the UA endpoints as well as the information regarding capabilities, resource impacts, and current resource usage statistics of the MGs 120, 130. In the present example of FIG. 1, assignment module 111 has assigned the call to MG 120.

The call proceeds via MG 120 using context 1, which in this example includes an Enhanced Variable Rate Codec (EVRC) termination and an Adaptive Multi-Rate audio codec (AMR) termination. Context 1 uses resources 121, which in this example includes processor resources (DSP and CPU), bandwidth resources, and other resources (e.g., hardware accelerator resources). In some embodiments, EVRC and AMR have different resource impacts from each other and from other codecs (e.g., G.729 and G.711). Assignment module 111 calculates the resource impacts of setting up context 1 in each of MG 120 and MG 130, compares those resource impacts while considering current resource usage, and assigns the call to MG 120 based on the comparison. Comparison criteria are discussed in more detail below.

FIG. 1 shows a call established between UA-D and UA-C via MG 130 and context 2. Assignment module 111 uses a similar process as that discussed above to assign the call to MG 130. Various embodiments described herein include MGC 110 receiving calls and assigning those calls to MG 120 and MG 130, perhaps millions of times, as MGC 110 operates over a period of time. Thus, over time, and as calls are established and torn down, assignment module 111 performs the processes described in more detail below to achieve balanced resource impacts.

MGC 110, MG 120, and MG 130 are all computer nodes with communication capabilities. The computer nodes are not limited to any particular hardware type, but may be implemented in some embodiments using commodity servers running an operating system (e.g., Linux) with MG and/or MGC functionality included as applications running on top of the operating system. Thus, various embodiments may include the MG and MGC functionality as computer-readable code that is executed by processors of the computer nodes. The computer nodes, as well as the UA endpoints, may be in communication with each other over any appropriate network, such as a Local Area Network (LAN), a cellular data network (e.g., an LTE network), the Internet, and/or the like.

Figure 2:
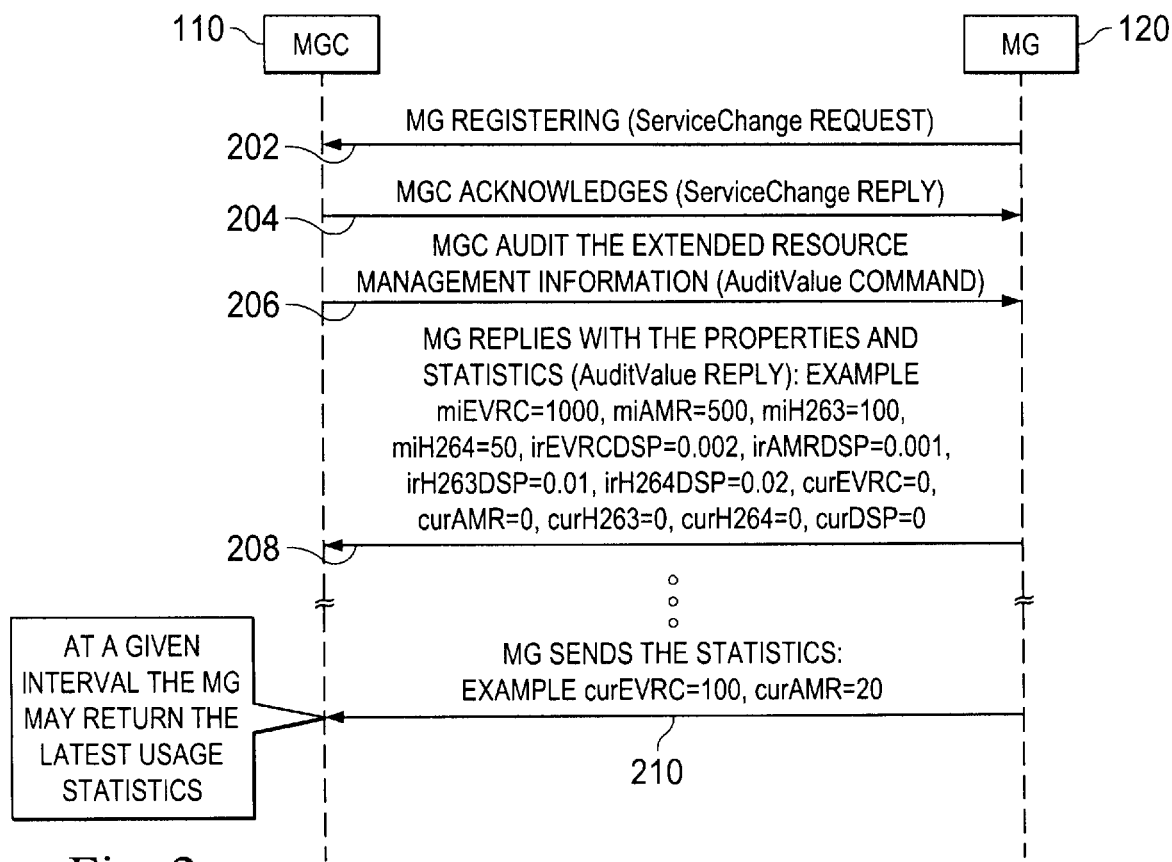
FIG. 2 is an example signal diagram showing an exchange of information between an MGC and an MGs, according to one embodiment.

FIG. 2 is an example signal diagram showing an exchange of information between MGC 110 and one of the MGs, either 120 or 130. For purposes of this example, it is assumed that both MGs 120 and 130 operate in a similar manner, so the example below focuses on MG 120 for ease of illustration. MGC 110 and MG 120, 130 communicate using H.248, though the scope of embodiments may include any appropriate communication protocol and technique to assign tasks by a controlling node to a subordinate node.

At message 202, MG 120 sends a ServiceChange request to MGC 110 to register with MGC 110. MGC 110 then sends back an acknowledgement at message 204. The present example of FIGS. 1 and 2 discloses a resources management method where MG 120 informs its controlling MGC 110 of various characteristics of the media capabilities it supports and which may have an impact on at least one MG resource or which may have an inherent limitation (such as a number of licenses). This information is then used by MGC 110 to efficiently distribute calls amongst its available MGs so congestion conditions of the MG resources are less likely to occur. Thus, MGC 110 sends signal 206 to MG 120 as an AuditValue command to request the relevant information. In some H.248 embodiments, MGs and MGCs may be capable of providing and receiving (respectively) different types of audit packages. In such examples, the AuditValue command may include a value that identifies an audit package response that includes some or all of the information described below.

In response to message 206, MG 120 searches its own data to find the requested data and to form the data into message 208 (AuditValue Reply). Media capabilities include media processes using internal MG resources and employed to fulfill the media requirements of a call request. In the example of MG 120, media capabilities include but are not limited to audio media codecs as defined by the LANA: EVRC, AMR, AMR-WB, G711, Internet Low Bit Rate Codec (iLBC), G729, and the like. Media capabilities may further include but are not limited to H261, H263, H264, Moving Picture Experts Group (mpeg) codecs, and the like. Other capabilities of MG 120 may further include tools for Dual Tone Multi Frequency (DTMF) interworking, Secure Real Time Transport Protocol (SRTP) encryption, T.38 adaptation, conferencing, Voice Quality Enhancements such as Background Noise Reduction (BNR), Echo Cancellation (Ecan), Acoustic Echo Control (AEC), Media Quality Monitoring (MQM), and the like.

Use of the media capabilities such as the ones listed above have an impact on the MG's DSP resources but may also affect the bandwidth (IP or TDM resources), the hardware accelerators, internal memory, or other limited resources. The MG may also have limits that would prevent it from using a given media capability when a certain number of instances of this media capability have been reached. That would be the case if for example a limited number of licenses were available for a certain codec or a certain media feature.

According to this example the MGs 120 and 130 controlled by MGC 110 store information regarding their own limitations and describing how each of the supported media capabilities affects their internal resources that may fall in a congestion state. In some examples, such information would typically be gathered by an MG provider who would perform benchmarking in order to characterize the performance of an MGs internal resources for the various supported media types. The MG provider would then populate a database with the information or create a file with the information, storing such information to memory at the MG 120 or another related device. Thus, in some examples, such information is programmed into MG 120 before or during deployment. However, in other embodiments, an MG may have intelligence to observe impacts over time and create impact information autonomously.

The information provided by MG 120 to MGC 110 includes the following categories: MG properties and MG statistics. One MG property includes Maximum Limits: The maximum number of instances that may use each of the media capabilities, if such limit exists. Codec licenses enter in this category. Hardcoded or physical limits to a media capability also fall in this category (e.g., a hardcoded maximum number of conference bridge calls or participants). It is also possible that other constraints or hardcoded limits would bound resource usage to a known limit. One example would be the limit of contexts per MG that standard H.248 allows to specify for a given MG (or virtual MG).

Another MG property is Impact on Resources: For each of the media capabilities, an estimate of the effect of using one media capability unit on the internal resource(s) that can realistically experience a congested state. If a media capability has no impact (or a trivial impact) on a given internal resource it may not be reported or be reported to have "0" impact. For the media types the impact value may include an approximation that reasonably estimates how the given media type will be used in the conditions prevailing on MG 120. The goal of the Impact on Resource information is to facilitate MGC 110 in making an assessment of how calls should be routed so internal resources are optimally used.

MG statistics include Current Media Type Usage: The current usage of instances that are currently using any one of the media capabilities. This value can be used by MGC 110 to re-assess its estimate of how many instances of the media capabilities are currently used. In the embodiment of FIGS. 1 and 2, MGC 110 may be assumed to have current knowledge of media capability usage. However, some embodiments, such as that shown in FIG. 3 (described in more detail below), an MG may be split into multiple virtual MGs, where virtual MGs may be controlled by different MGCs. In such an instance, the limits on licenses may apply to the MG as a whole, where the virtual MGs share the same finite pool of licenses. However, a given MGC controlling a first virtual MG may not realize when another MGC causes a second virtual MG to use a media capability. Hence it is possible that the actual maximum number of instances is unachievable since another MGC have already reserved instances of a given media capability. Thus, current media type usage statistics may help to keep MGCs aware of media type usage even when MGs are virtual.

Another MG statistic includes Current Internal Resource utilization: For each internal resource that may experience a congestion state, the current percentage or portion of utilization. Many MGCs may have access to the same MG (using virtual MGs) hence it is possible that at a given time various internal resources of an MG are more heavily used than any one MGC could know by tracking its own assignments. The current internal resource utilization value can therefore be used by the MGC to re-assess its estimate of how MG internal resources are currently used. A given MG tracks its current media type usage and current internal resource utilization statistic, formats that information into message 210, and sends message 210 to MGC 110. Various embodiments may include sending message 210 at any appropriate time. For instance, some embodiments include sending message 210 periodically (e.g., 10 seconds) and/or at events (e.g., the assignment of a call to the MG or tear down of a call) and the like.

Figure 3:
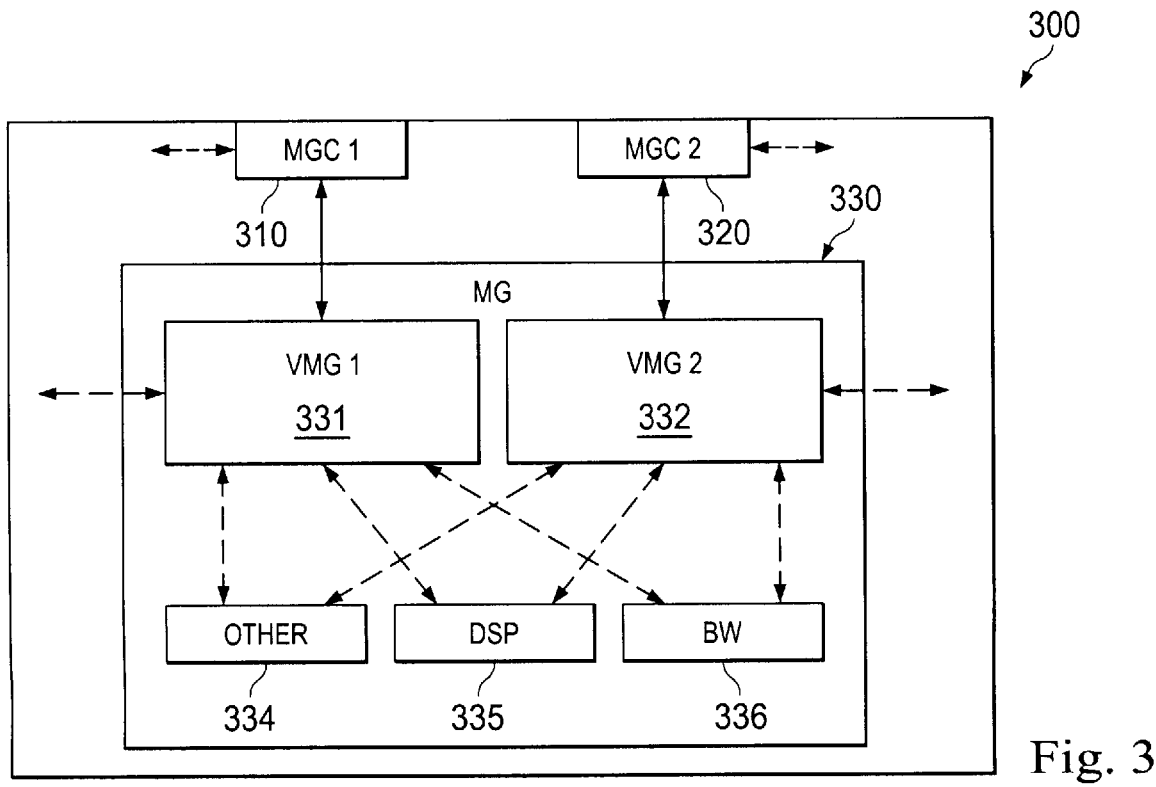
FIG. 3 is an illustration of an example architecture adapted according to one embodiment and using virtual MGs.

As noted above, the use of virtual MGs may create situations in which a given MGC may not be able to track MG resource usage without more information. Thus, various embodiments include the message 210 with MG statistics information. FIG. 3 is an illustration of an example architecture 300 adapted according to one embodiment and using virtual MGs 331, 332. Specifically, MG 330 include resources 334-336, which are shared by virtual MGs 331, 332. Virtual MG 331 is controlled by MGC 310, whereas virtual MG 332 is controlled by MGC 320. Each of the virtual MGs 331 and 332 separately calculates its MG statistics and reports its MG statistics to its respective MGC 310 and 320 using message 210. Thus, the principles described herein may be applied to the architecture of FIG. 3, where each of the MGCs 310, 320 would include an assignment module and assign calls to MGs and virtual MGs based on the information discussed above.

Returning to the example of FIG. 2, various embodiments may include a proprietary or a new H.248 extended Resource Management Package may be created to carry the information specified above. Thus, message 206 may be adapted to request a new package, and message 208 may be adapted to return the requested information in the package to MGC 110.

It is noted above that the scope of embodiments is not limited to MGs and MGCs or even to H.248. Rather, the concepts herein may be applied to any system that includes a master computer node and one or more subordinate nodes, where the master node assigns processing tasks (e.g., calls) to the subordinate nodes for processing. Nevertheless, the example below provides one specific approach to adapt the concepts herein to H.248.

Multiple properties are reported by the MGs according to this example which according to the MEGACO/H.248 standards may be reported in a Property. The Property names used in FIG. 2 are constructed as follows: <Property Type><Media Type><Resource Type>, where:

<Property Type>: The type of property that is reported. Types include:
Maximum instance "mi": The maximum number of instances that may use each of the media capability.
Impact on Resources "ir": An estimate of the impact that using one unit of the Media Type has on a Resource. In the following text a percentage is
used for this value.

<Media Type>: Media Type supported that is reported. When applicable the formats defined by the IANA may be used or a format understood by both the MGs and the MGC. Examples include:
Audio media: "EVRC", "AMR", "AMR-WB", "G711", "iLBC", "AMR-WB", "G729", and the like.
Video media: "H261", "H263", "H264", "mpeg", and the like.
Other capabilities: "DTMF", "SRTP", "T38", "BNR", "ecan", "AEC", "MQM", and the like.

<Resource Type>: An internal MG Resource that may experience a congested state when a media type is used. The format used may be mutually understood by the MGs and the MGC. Examples are shown below:
DSP resources: "DSP"
IP resources: "IP"
Hardware Accelerator Resources: "HA"
Bandwidth Resources: "BW"

Thus, the property name used in message 208 to report the maximum number of instances allowed of the EVRC codec is "mi_EVRC" and the property name used to report the impact on the DSP Resources of using AMR is "ir_AMR_DSP".

The Current Usage of a given Media type is reported as a statistic. The Statistic names used in message 210 are constructed as follows: <cur><Media Type>. So for example the statistic name used to report the current number of instances using the AMR codec is curAMR.

The Current Usage of a given internal Resource is also reported as a statistic. The Statistic names used in message 210 are constructed as follows: <cur><Resource Type>. So for example the statistic name used to report the current DSP usage is curDSP.

An event descriptor may also be specified so the current media and resource usage statistics are reported at the occurrence of an event or at a fixed interval. Properties may also be updated by the MG if a media capabilities change occurs (e.g., a change in the license limit).

MGC 110 uses the information above to efficiently distribute calls amongst its available MGs based on the information it now has about them. When MGC 110 receives a call request, assignment module 111 performs an algorithm to determine which MG (120 or 130) should be assigned the call. The algorithm includes calculating what the total impact of the Media Capabilities required for that call is for each of the reported internal resources. For example if a call requires codecs AMR, EVRC, H.263 and H.264 and MG 120 has previously reported the properties and statistics shown in messages 208 and 210, the total impact that call is expected to have on DSP resources at MG 120 would be estimated at 0.001+0.002+0.02+0.01=0.033, where 1.0 would indicate one-hundred percent. A similar calculation is performed for the reported information provided by MG 130 (while MG 130 is not shown in FIG. 2, it is understood that MG 130 provides its own information).

Assignment module 111 then routes the call to the MG 120 or 130 that has the lowest estimated resources usage if it still utilizes less than the maximum allowed number of instances for each of the required Media types. If MGC 110 has information about the impact the Media Types have on more than one internal Resource (ex. DSP and IP) assignment module 111 may attempt to offload the particular MG 120 or 130 that has one of its resource types most heavily used. For example, if assignment module 111 currently estimates that MG 120 has a DSP usage of 0.2 and an IP usage of 0.3 while MG 130 has a DSP usage of 0.1 but an IP usage of 0.4, assignment module 111 decides to route the call towards MG 120 in order to offload MG 130 IP resources.

Assignment module 111 may also have a more sophisticated approach where the actual impact of a given call is taken into consideration in the routing decision. Assignment module 111 would then route calls that are less impactful on a given resource to MGs that are more heavily loaded and calls that are more impactful to MGs that are less loaded. Such approach may be particularly useful in cases where an MG 120 or 130 has reported a near congestion state and where the MG is requesting MGC 110 to redirect a portion of the calls it would normally receive. Recommendation ITU-T H.248.32 (Detailed congestion reporting) and recommendation ITU-T H.248.10 (Detailed congestion reporting package) offer MG congestion control mechanisms where calls may be either dropped or re-routed to another MG when a near congestion state is detected on a MG and may benefit from the present disclosure.

Once it has selected a MG 120 or 130 to receive the call, assignment module 111 increment its estimated Total Resources Usage it maintains for each of the internal resources for that MG. Continuing with the present example, assuming that MG 120 was selected, assignment module 111 would increment the Total DSP usage it maintains for MG 120 by 0.033. Assignment module 111 may maintain such information in volatile or non-volatile memory at MGC 110 or at another device (not shown) on the network.

Once a call is torn down assignment module 111 decrements the estimated Total Resources Usage it maintains for each of the internal resources for that MG. In this example, when the call is torn down assignment module 111 would decrement the Total DSP usage on MG 120 by 0.033.

When MGC 110 receives an updated set of usage statistics assignment module 111 updates its estimated statistics based on this latest Media and internal Resources information. In this example, if MGC 110 receives a current DSP usage from MG 120 of 0.5 while it currently estimates the Total DSP usage of MG 120 at 0.033, it may update its estimate to 0.5. Since MG resources may be used by multiple MGCs (in a virtual MG embodiment, as in FIG. 3) the total estimate may fall under zero, in which case a value of 0 may be assumed. Assignment module 111 may then increment the statistics report interval when an MG is used by multiple MGCs.

In some embodiments MGs 120 and 130 may return extra media parameters that are mutually understood between MGC 110 and MGs 120, 130 and that can reasonably impact the internal resources. If for example an MG 120 or 130 is expected to use AMR codecs at single rate, then the rate parameter and the impact the various AMR rates have on the internal resources of MG 120 or 130 could also be passed to MGC 110 in message 208 (FIG. 2).

It should also be noted that the effect of using one unit of a given Media capability is assumed to be incremental in the example above. Such assumption is made in order to simplify the model, which does not have to be perfect, while yet being representative of reality. However, other embodiments may use a more technically sophisticated approach, including MGs 120, 130 calculating non-incremental impacts, as appropriate.

Figure 4:
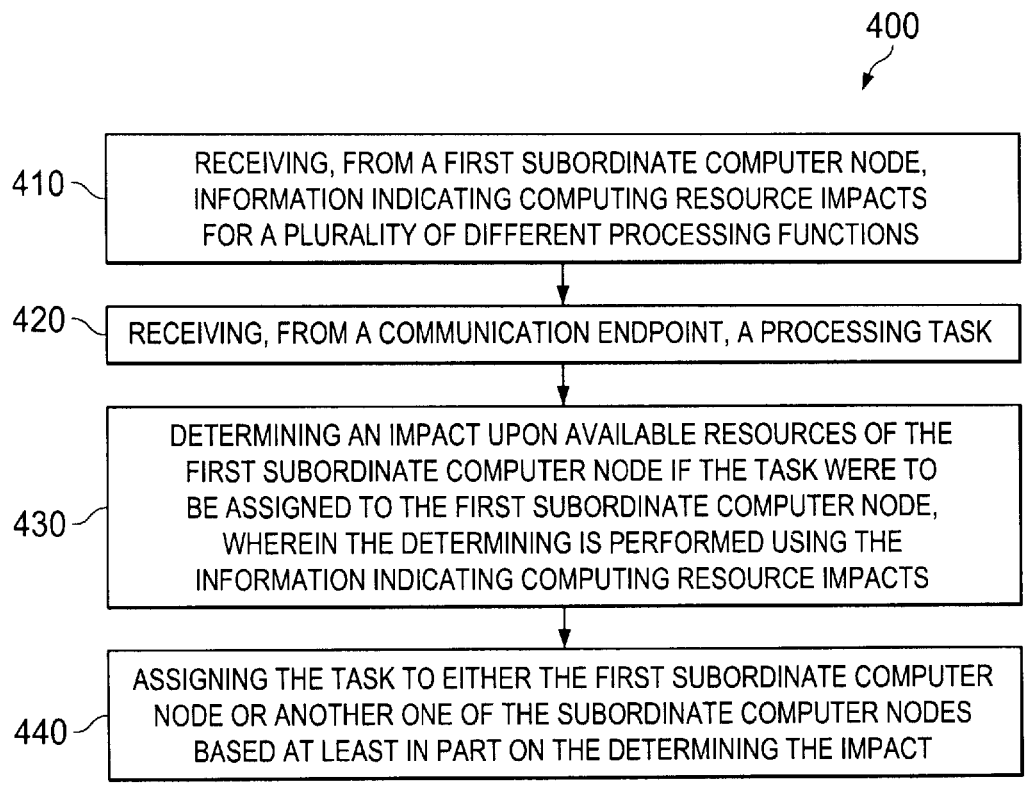
FIG. 4 is a simplified block diagram of an example method, adapted according to one embodiment.

FIG. 4 is a simplified block diagram of method 400, adapted according to one embodiment. Method 400 may be performed by a controlling computer node, such as assignment module 111 and/or MGC 110 of FIGS. 1 and 2. For instance, a computer providing MGC functionality may read executable code from a non-transitory medium and then execute the code to perform the actions described below.

At action 410, the controlling computer node receives, from a first subordinate computer node, information indicating computing resource impacts for a plurality of different processing functions.

In the example of FIG. 2, message 208 includes, among other things, computing resource impacts of a particular codec (a processing function) for a particular resource (e.g., a DSP). One example is "ir_EVRC_DSP," which is a measure of the presumed impact of using the EVRC codec upon DSP usage for a particular MG (a subordinate computer node). The particular MG may have more than one capability (e.g., multiple different codecs for use) and more than one resource that may be impacted (e.g., DSP usage, bandwidth, CPU usage, hardware accelerator usage)—for each capability, a different resource impact number is presumed for each resource that it impacts. Thus, action 410 may include receiving information for multiple processing functions for multiple resources. Furthermore, action 410 may also include receiving similar information for a variety of other subordinate computer nodes.

Action 410 in some embodiments includes storing the received information for present use or later use. For instance, the controlling computer node may include a database or file structure to save and organize the received information. During later actions, the controlling computer node may use the saved information to determine potential impacts when assigning a received task.

Also, various embodiments may include receiving statistic information from the subordinate computer nodes. For instance, subordinate computer nodes may report current resource usage (e.g., DSP usage, hardware accelerator usage, bandwidth usage, and the like), which is also stored and organized by the controlling computer node. The controlling computer node may use the statistic information as well in selecting a subordinate computer node to which to assign a task.

At action 420, the controlling computer node receives a processing task to be assigned to a subordinate computer node. An example of a processing task may include a multimedia call to be handled by a subordinate computer node, where the significant computing jobs for the multimedia call include translating media from one codec to another codec. In the example of FIG. 1, the processing task includes hosting a call from UA-A to UA-B and providing a context to terminate the respective codecs.

At action 430, the controlling computer node determines an impact upon available resources of a first subordinate computer node if the task was assigned to the first subordinate computer node. Consistent with the example of FIG. 2 above, the controlling computer node queries its stored information to determine the impact upon resources of the first node if the controlling node were to assign the task to the first node. Action 430 may include determining which resources would be used (e.g., which codecs would be used) by the first node if the task was handled by the first node. Returning to the example of FIG. 2, "ir_EVRC_DSP" equals 0.002, and "ir_AMR_DSP" equals 0.001; therefore, if a task was to be assigned to the first node and would employ a context at the first node having an EVRC termination and a AMR termination, the impact upon the first node's DSP would be 0.003 or 0.3% of DSP usage.

Of course, a particular task at a particular node may affect other resources as well, and the controlling computer node would determine those impacts too at action 430. Action 430 also includes in some examples determining similar resource impacts at each of the other subordinate nodes. Action 430 may additionally include determining if a particular capability has a limit (e.g., a number of licenses) and examining current usage statistics of the subordinate nodes.

At action 440, the controlling computer node assigns the task to either the first subordinate computer node or another one of the subordinate computer nodes based at least in part on determining the impact. In one example, the controlling node assigns the task to the first node based upon determining that the first node has available resources (e.g., available licenses for codecs) and a lower current resource usage of at least one resource when compared to the other subordinate nodes. The disclosure above with respect to FIG. 2 provides examples of selecting a MG using current use statistics and multiple different resource impacts for multiple MGs. Such principles are applicable to a variety of different types of computer nodes.

It should be noted that the disclosure is not limited to the specific embodiments shown above. For instance, the controlling node may perform method 400 each time a new task is to be assigned to a subordinate computer node, determining and comparing resource impacts and current usage statistics among a variety of different subordinate nodes.

In another embodiment, action 430 includes determining how assigning the task to each of the respective subordinate nodes would affect license use at each of the nodes. For instance, ones of the nodes may have fewer licenses for a particular codec, and action 430 would include noting this discrepancy. Action 440 would then include assigning the task to a subordinate node with a greater number of available licenses, thereby avoiding exhausting the available licenses at another node. Alternatively, action 440 may include assigning a task to a particular subordinate node to concentrate the use of a particular codec at that node. Any appropriate assignment strategy can be used with various embodiments.

Various embodiments may include one more advantages over previous solutions. Some embodiments permit a more efficient use of MG resources than the existing approaches which are more reactive in nature. Existing solutions tend to assume that all calls have the same effect on the MG internal resources and will therefore have the MGC uniformly distributing calls amongst the MGs it controls (e.g., using a round robin strategy). However, a round-robin strategy may not evenly distribute load and may cause congestion at some nodes. In such scenarios, an MGC may only be reacting to congestion when reported rather than proactively avoiding congestion. Various embodiments described above provide a proactive manner of avoiding congestion. Various embodiments may also allow a provider of MGs to efficiently use the licenses it bought, which no current solution addresses.

Figure 5:
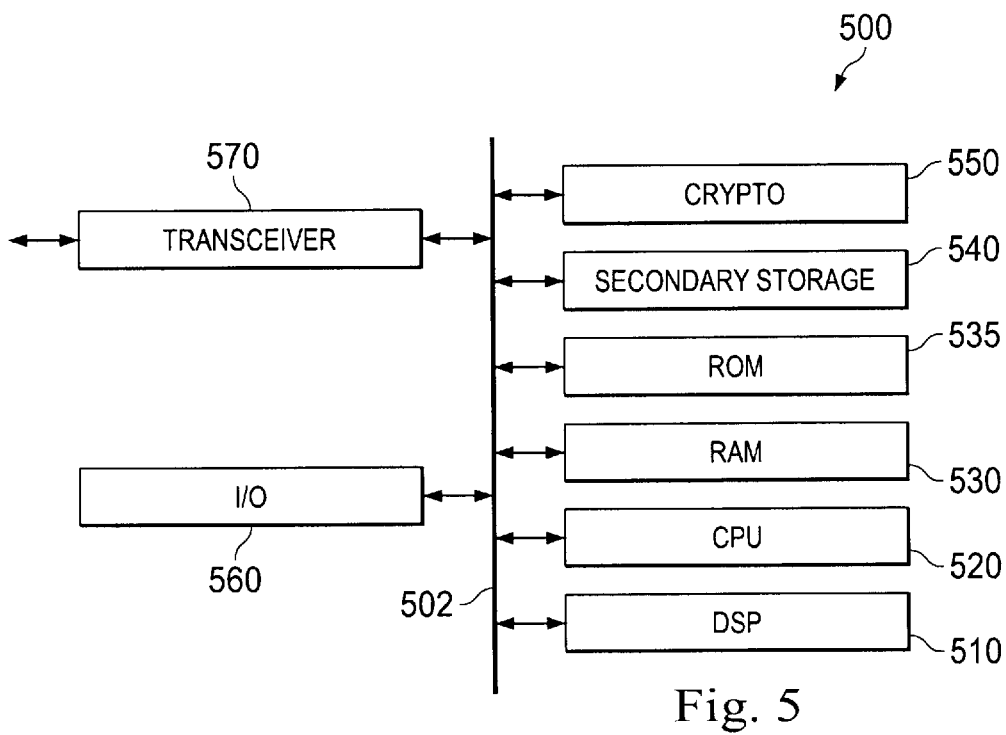
FIG. 5 illustrates an example computer system adapted according to one embodiment of the present disclosure

FIG. 5 illustrates an example computer system 500 adapted according to one embodiment of the present disclosure. The computer system 500 includes an example system on which embodiments of the present disclosure may be implemented (such as MGC 110, MGs 120 and 130, and endpoints UA). The computer system 500 includes a digital signal processor (DSP) 510, a central processing unit (CPU) 520, a random access memory (RAM) 530, a read-only memory (ROM) 535, secondary storage 540, encryption and decryption resources 550, input/output (I/O) devices 560, and a of transceivers 570, all of which may be communicatively coupled via a bus 502.

The CPU 520 may be implemented using hardware or a combination of hardware and software. Although illustrated as a single CPU, the CPU 520 is not so limited and may comprise multiple processors. The CPU 520 may be implemented as one or more processors, i.e., as one or more chips, cores (e.g., a multi-core processor), field-programmable gate arrays (FPGAs), and/or application specific integrated circuits (ASICs). Likewise, the DSP 510 may be implemented as more than one DSP chip. The DSP 510 may perform transcoding or transrating of a media stream or call flow received by a transceiver 570. Crypto resources 550 may include a hardware accelerator for performing security features such as encryption or authentication of a media stream or call flow received by transceiver 570.

The secondary storage 540 may comprise one or more disk drives or solid state drives and is used for non-volatile storage of data and as an over-flow data storage device if the RAM 530 is not large enough to hold all working data. The RAM 530 may be static RAM, dynamic RAM, or the like, and the ROM 535 may be programmable ROM (PROM), erasable PROM (EPROM), electrically EPROM (EEPROM), or the like. The secondary storage 540 may be used to store programs that are loaded into the RAM 530 when such programs are selected for execution. The ROM 535 is used to store instructions and perhaps data that are read during program execution. The ROM 535 is a non-volatile memory device that typically has a small memory capacity relative to the larger memory capacity of the secondary storage. The RAM 530 is used to store volatile data and perhaps to store instructions. Access to both the ROM 535 and the RAM 530 is typically faster than to the secondary storage 540.

The computer system 500 includes transceivers 570. There may be a transceiver 570 for each communication line (e.g., electrical or optical) coupled to the computer system 570. A transceiver 570 may be bidirectional or unidirectional, depending on the embodiment. Each transceiver 570 is adapted to couple computer system 500 to a communication link (e.g., a wired or wireless communication link). In the examples of FIGS. 1 and 3, transceivers 570 may couple an MG to an MGC and couples MGs to UAs.

The I/O devices 560 may include a keyboard, a computer mouse, a microphone, and/or a display device for allowing a user to provide input to and receive output from the computer system 500.

It is understood that by programming and/or loading executable instructions onto the computer system 500, at least one of the CPU 520, the RAM 530, and/or the secondary storage 540 are changed, transforming the computer system 500 in part into a particular machine or apparatus having the functionality taught by the present disclosure. The executable instructions may be stored on the RAM 530 or secondary storage 540 and loaded into the CPU 520 for execution. The device functionality described above with respect to FIGS. 1-4 may be implemented as a software application running on the CPU 520 and using the RAM 530, the ROM 535, and/or secondary storage 540. Specifically, for MGC 110, its functions described at FIG. 1-4 may be implemented as a software application running on the CPU 520.

Logic may be encoded in a non-transitory computer-readable medium, such as RAM 530 and/or secondary storage 540. Such a medium can take many forms, including but not limited to, non-volatile media and volatile media. In various implementations, non-volatile media includes optical or magnetic disks, such as secondary storage 540, and volatile media includes dynamic memory, such as various types of RAM 530. CPU 520 reads application code from the readable medium and executes the code to provide the described functionality.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method performed by a controlling computer node in a network with a plurality of subordinate computing nodes, the method comprising:
  receiving, from a first subordinate computer node comprising a plurality of virtual subordinate nodes in which at least one of the virtual subordinate nodes receives processing tasks from a different controlling computer node, the controlling computer node and the different controlling computer node being configured to decide which of a plurality of subordinate computer nodes to assign tasks, information indicating estimated computing resource impacts shared by the virtual subordinate nodes of the first subordinate computer node for a plurality of different processing functions as determined by the first subordinate computer node;
  receiving, from a communication endpoint, a processing task;
  determining an impact upon available resources of the first subordinate computer node if the task were to be assigned to the first subordinate computer node, wherein the determining is performed using the information indicating estimated computing resource impacts; and
  assigning the task to either the first subordinate computer node or another one of the subordinate computer nodes based at least in part on the determining the impact.

2. The method of claim 1, wherein the processing task comprises a request to set up a multimedia communication session.

3. The method of claim 1, wherein the controlling computer node comprises a H.248 Media Gateway Controller (MGC), and further wherein the subordinate computing nodes comprise H.248 Media Gateways (MGs).

4. The method of claim 1, wherein the information indicating estimated computing resource impacts comprises:
data indicating processor usage portions for each of multiple available codecs.

5. The method of claim 4, wherein determining the estimated computing resources impacts comprises:
determining processor usage for the first subordinate computer node based on an assumption of use of a specific codec;
further wherein assigning the task comprises:
assigning a multimedia communication session to either the first subordinate computer node or another one of the subordinate computer nodes based at least in part on a comparison of processor usage by the specific codec by the plurality of subordinate computer nodes.

6. The method of claim 1, wherein each of the processing functions corresponds to a respective media capability, further wherein the information indicating estimated computing resource impacts for a plurality of different processing functions includes:
for each media capability, information indicating a resource impact of using one unit of the media capability.

7. The method of claim 1, wherein the controlling computer node communicates with the subordinate computer nodes as part of a signaling process, and further wherein either the first subordinate computer node or another one of the subordinate computer nodes performs the task as part of a multimedia conversation separate from the control process.

8. The method of claim 1, further comprising:
receiving, from the first subordinate computer node, current computing resource use statistics.

9. The method of claim 8, wherein assigning the task comprises:
calculating a resulting computing resource use at the first subordinate computer node using the current computing resource use statistics and the information indicating estimated computing resource impacts and assigning the task based on a lower resulting computing resource use at either the first subordinate computer node or another one of the subordinate computer nodes.

10. A system comprising:
a controlling computer node in a network and communicating with a plurality of subordinate computing nodes, the controlling computer node including a processor executing computer-readable code to:
receive, from a first subordinate computer node comprising a plurality of virtual subordinate nodes in which at least one of the virtual subordinate nodes receives processing tasks from a different controlling computer node, the controlling computer node and the different controlling computer node being configured to decide which of a plurality of subordinate computer nodes to assign tasks, information indicating available resources and estimated resource impacts on resources shared by the of the first subordinate computer node as determined by the first subordinate computer node;
receive, from a communication endpoint, a processing task;
calculate a use of available resources for the first subordinate computer node to execute the task, wherein the calculating is based at least on part on the information indicating available resources and resource impacts;
compare the use of available resources of the first subordinate computer node to that of other ones of the subordinate computer nodes; and
assign the task to either the first subordinate computer node or another one of the subordinate computer nodes based at least in part on the comparing.

11. The system of claim 10, wherein the information indicating available resources comprises:
a maximum number of license-defined codec instantiations.

12. The system of claim 10, wherein the controlling computer node comprises a H.248 Media Gateway Controller (MGC), and further wherein the subordinate computing nodes comprise H.248 Media Gateways (MGs).

13. The system of claim 10, wherein the information indicating available resources and estimated resource impacts comprises:
data indicating processor usage portions for each of multiple available codecs.

14. The system of claim 10, wherein the processing task comprises a request to set up a multimedia communication session with another communication endpoint.

15. The system of claim 10, further comprising memory including a data structure that stores the information indicating computing resource impacts for the first subordinate computer node and for other subordinate computer nodes.

16. A computer program product having a non-transitory computer readable medium tangibly recording computer program logic for establishing a multimedia communication session between a first user and a second user, the computer program product comprising:
code to receive, at a controlling computer node, a request to establish the multimedia communication session;
code to select a first subordinate computer node of a plurality of subordinate computer nodes to handle the multimedia communication session, the first subordinate node comprising a plurality of virtual subordinate nodes in which at least one of the virtual subordinate nodes receives processing tasks from a different controlling computer node, the controlling computer node and the different controlling computer node being configured to decide which of a plurality of subordinate computer nodes to assign tasks, the selecting including:
code to examine respective resource usage impacts upon resources shared by the virtual subordinate nodes of each of the subordinate computer nodes by viewing the multimedia communication session as a unit of use of a multimedia capability that is associated with a presumed resource usage impact at each of the subordinate computer nodes;
code to compare the respective resource usage impacts among the plurality of subordinate computer nodes; and
code to select the first subordinate computer node to handle the communication session in response to the comparing of estimated usage impacts received from the first subordinate computer node; and
code to assign the multimedia communication session to the first subordinate computer node in response to the selecting.

17. The computer program product of claim 16, wherein the code to compare comprises:

code to compare codec instantiation use among the plurality of subordinate computer nodes;

further wherein the code to assign comprises:
code to balance codec use among the plurality of subordinate computer nodes.

18. The computer program product of claim 16, in which the code to examine comprises:
code to add current resource usage statistics to the presumed resource usage impact at each of the subordinate computer nodes to determine the respective resource usage impact for each of the subordinate computer nodes.

19. The computer program product of claim 16, wherein resource usage impacts comprise at least one of:
total Central Processing Unit (CPU) usage;
total in Digital Signal Processor (DSP) usage;
total bandwidth usage.

20. The computer program product of claim 16, further comprising:
code to receive, at registration of a subordinate computer node, information indicating computing resource impacts for a plurality of different processing functions.

* * * * *